United States Patent
Wang et al.

(10) Patent No.: US 12,200,019 B2
(45) Date of Patent: Jan. 14, 2025

(54) METHOD FOR ESTABLISHING COMMUNICATION CONNECTION AND ELECTRONIC APPARATUS CAPABLE OF ESTABLISHING COMMUNICATION CONNECTION

(71) Applicant: SAMSUNG ELECTRONICS CO., LTD., Suwon-si (KR)

(72) Inventors: Dafu Wang, Suzhou Industrial Park (CN); Chenggang Guo, Suzhou Industrial Park (CN); Lei Zheng, Suzhou Industrial Park (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 18/054,859

(22) Filed: Nov. 11, 2022

(65) Prior Publication Data
US 2024/0007508 A1   Jan. 4, 2024

(30) Foreign Application Priority Data
Jun. 29, 2022   (CN) .......................... 202210762181.6

(51) Int. Cl.
   *H04L 65/1069*   (2022.01)
   *H04L 65/1016*   (2022.01)
   *H04L 65/1073*   (2022.01)

(52) U.S. Cl.
   CPC ...... *H04L 65/1069* (2013.01); *H04L 65/1016* (2013.01); *H04L 65/1073* (2013.01)

(58) Field of Classification Search
   CPC .................. H04L 65/1016; H04L 65/1073
   USPC ......................................................... 709/231
   See application file for complete search history.

(56) References Cited

U.S. PATENT DOCUMENTS

| | | | |
|---|---|---|---|
| 7,746,891 B2 | 6/2010 | Yamamoto et al. |
| 9,526,119 B2 | 12/2016 | Sedlacek et al. |
| 10,050,931 B2 | 8/2018 | Choi et al. |
| 10,687,380 B2 | 6/2020 | MacDougall et al. |
| 2013/0107888 A1 | 5/2013 | Guo |
| 2016/0344688 A1 | 11/2016 | Lakhera et al. |

(Continued)

FOREIGN PATENT DOCUMENTS

| CN | 113225323 A | 8/2021 |
|---|---|---|
| KR | 10-1520811 B1 | 5/2015 |
| WO | WO2015081971 A1 | 6/2015 |

OTHER PUBLICATIONS

Office Action dated Nov. 30, 2024 in related Chinese No. 202210762181.6, 6 pages (in Chinese).

*Primary Examiner* — Lan Dai T Truong
(74) *Attorney, Agent, or Firm* — F. CHAU & ASSOCIATES, LLC

(57) ABSTRACT

A method for establishing a communication connection includes sending a first packet data network (PDN) connection request message to a network side for internet protocol multimedia subsystem (IMS) registration; repeatedly sending the first PDN connection request message for the IMS registration when the IMS registration fails; and sending a second PDN connection request message to the network side for the IMS registration when a number of times the IMS registration fails reaches a predetermined number. The second PDN connection request message and the first PDN connection request message include different PDN types.

18 Claims, 4 Drawing Sheets

(56) References Cited

U.S. PATENT DOCUMENTS

2017/0026334 A1  1/2017 Youn et al.
2020/0008140 A1* 1/2020 Kim .................. H04W 60/00
2021/0100047 A1  4/2021 Chiba et al.

* cited by examiner

METHOD FOR ESTABLISHING COMMUNICATION CONNECTION AND ELECTRONIC APPARATUS CAPABLE OF ESTABLISHING COMMUNICATION CONNECTION

CROSS-REFERENCE TO RELATED APPLICATION

The present application claims priority under 35 U.S.C. § 119 to Chinese Patent Application No. 202210762181.6, filed in the China National Intellectual Property Administration (CNIPA) on Jun. 29, 2022, the entire contents of which are herein incorporated by reference.

TECHNICAL FIELD

The present disclosure relates to wireless communication technology, and more specifically, to a method and an electronic apparatus for establishing a packet data network (PDN) communication connection.

DISCUSSION OF THE RELATED ART

In an existing 3GPP protocol, as may be seen in FIG. 1, when a user equipment (UE) initiates an internet protocol multimedia subsystem (IMS) registration, the UE side sends a "PDN CONNECTIVITY REQUEST" message to a network side to request an IMS registration, receives an "ACTIVATE DEFAULT EPS BEARER CONTEXT REQUEST" message from the network side, and sends an "ACTIVATE DEFAULT EPS BEARER CONTEXT ACCEPT" message to the network side. Since there is no requirement in the current 3GPP protocol that an IPv4 stack must be used, an IPv6 stack or an IPv4v6 dual stack may be used when establishing an IMS PDN connection request, and an PDN type used to establish the IMS PDN connection request needs to depend on the PDN type supported by networks of operators, when the network does not support the PDN type (for example, IPv4) carried by the "PDN CONNECTIVITY REQUEST" message, the "ACTIVATE DEFAULT EPS BEARER CONTEXT REQUEST" message sent from the network side does not carry an Internet Protocol (IP) address. If the UE side does not detect the IP address (for example, protocol configuration option (PCO) proxy call session control function (P-CSCF) IPv4 address) from the "ACTIVATE DEFAULT EPS BEARER CONTEXT REQUEST" message, then sends a "PDN DISCONNECT REQUEST" message to disconnect the IMS PDN connection, receives a "DEACTIVATE DEFAULT EPS BEARER CONTEXT REQUEST" message from the network and sends a "DEACTIVATE DEFAULT EPS BEARER CONTEXT ACCEPT" message, and in that case, even though a protocol layer processing activates the IMS PDN, UE high-level judges that an IMS signaling addressing cannot be performed, and then triggers the IMS PDN deactivation process immediately, so that the UE cannot register the IMS. That is, when the UE initiates the IMS registration, the UE needs to interact with the network to make the IMS registration successful. However, if the IP address type of the PDN connection request sent by the UE does not match the IP address type supported by the network, the UE may fail to register and use IMS services, resulting in permanent IMS registration failure.

SUMMARY

A method for establishing a communication connection includes sending a first packet data network (PDN) connection request message to a network side for Internet Protocol multimedia subsystem (IMS) registration. The first PDN connection request message for the IMS registration is repeatedly sent when the IMS registration fails. A second PDN connection request message is sent to the network side for the IMS registration when a number of times of IMS registration failures reaches a predetermined number of times. The second PDN connection request message and the first PDN connection request message contain different PDN types.

It may be determined that the IMS registration fails when a response message without carrying an Internet Protocol (IP) address, for the first PDN connection request message is received from the network side.

The PDN type contained in the first PDN connection request message may be an Internet protocol version 4 (IPv4) single stack, and the PDN type contained in the second PDN connection request message may be an IPv4v6 dual stack.

The method may further include initializing a counter for counting the number of times of the IMS registration failures when sending the second PDN connection request message to the network side for the IMS registration.

The first PDN connection request message and the second PDN connection request message may further include access point (APN) type information indicating the IMS.

There may be a specific time period between processes of repeatedly sending the first PDN connection request message for two consecutive times.

An electronic apparatus capable of establishing a communication connection includes a communication unit communicating with a network side. A control unit controls the communication unit to send a first packet data network (PDN) connection request message to the network side for internet protocol multimedia subsystem (IMS) registration. The control unit further controls the communication unit to repeatedly send the first PDN connection request message for the IMS registration when it is determined that the IMS registration fails. The control unit further controls the communication unit to send a second PDN connection request message to the network side for the IMS registration when it is determined that a number of times of IMS registration failures reaches a predetermined number of times. The second PDN connection request message and the first PDN connection request message contain different PDN types.

The control unit may determine that the IMS registration fails, when the communication unit receives a response message without carrying an Internet Protocol (IP) address, for the first PDN connection request message, from the network side.

The PDN type contained in the first PDN connection request message may be an Internet protocol version 4 (IPv4) single stack, and the PDN type contained in the second PDN connection request message may be an IPv4v6 dual stack.

The control unit may initialize a counter for counting the number of times of the IMS registration failures, when the communication unit sends the second PDN connection request message to the network side for the IMS registration.

The first PDN connection request message and the second PDN connection request message may further comprise access point (APN) type information indicating the IMS.

There may be a specific time period between processes of repeatedly sending the first PDN connection request message for two consecutive times.

An electronic apparatus includes at least one processor and at least one memory device storing computer-executable instructions. The computer-executable instructions, when executed by the at least one processor, cause the at least one processor to execute the above methods for establishing the communication connection.

A computer-readable storage medium includes instructions that, when executed by at least one processor, cause the at least one processor to execute the above methods for establishing the communication connection.

BRIEF DESCRIPTION OF THE DRAWINGS

The above and other aspects, features and elements of embodiments of the present disclosure will be more apparent through the following description in combination with the accompanying drawings, in which.

DETAILED DESCRIPTION OF THE DRAWINGS

Hereinafter, embodiments of the present disclosure will be described in detail with reference to the accompanying drawings.

The term "include" or "contain" used in the specification indicates the existence of the stated features, whole, steps, operations, elements, components and or combinations thereof, but does not exclude the existence or addition of one or more other features, whole, steps, operations, elements, components and/or combinations thereof. It should be understood that although the terms "first", "second", "third", etc. are used to describe various information, the information should not necessarily be limited by these terms. These terms are used to distinguish one type of information from another type of information. For example, without departing from the scope of the present disclosure, the first information may be referred to as the second information; and similarly, the second information may also be referred to as the first information.

Embodiments of the present disclose consider a case of the failure of IMS registration when the PDN type of the IE does not match the PDN type of the network side, overcomes the shortcomings in the prior art, provides a method and electronic apparatus for establishing a communication connection, and effectively solves the problem that the UE side cannot register to IMS when the PDN type of the UE side does not match the PDN type supported by the network side, ensures that the IMS can still be successfully registered without manually setting the network when the PDN type supported by the network side does not match that of the UE side, so as to avoid directly causing the IMS registration failure. In addition, the processing of modifying the PDN type by the method and electronic apparatus according to the present disclosure might not need to interact with the network side, which can reduce radio resources and signaling interaction with the network side, and reduce power consumption.

The effects that can be obtained from the present disclosure might not be limited by the above effects, and those skilled in the art to which the present disclosure belongs can clearly understand other effects, which are not mentioned from the following description.

Figure 1:
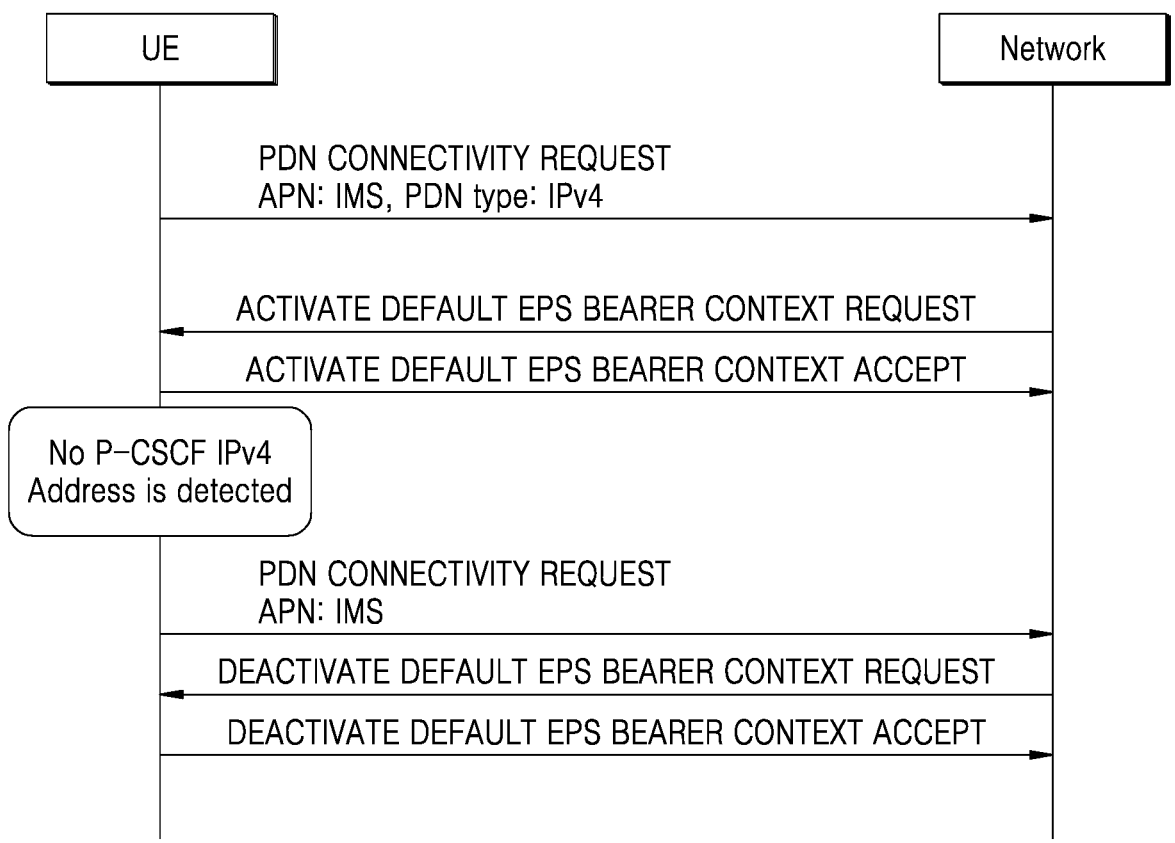
FIG. 1 is a diagram showing a UE registration IMS process according to a comparative example.
Figure 2:
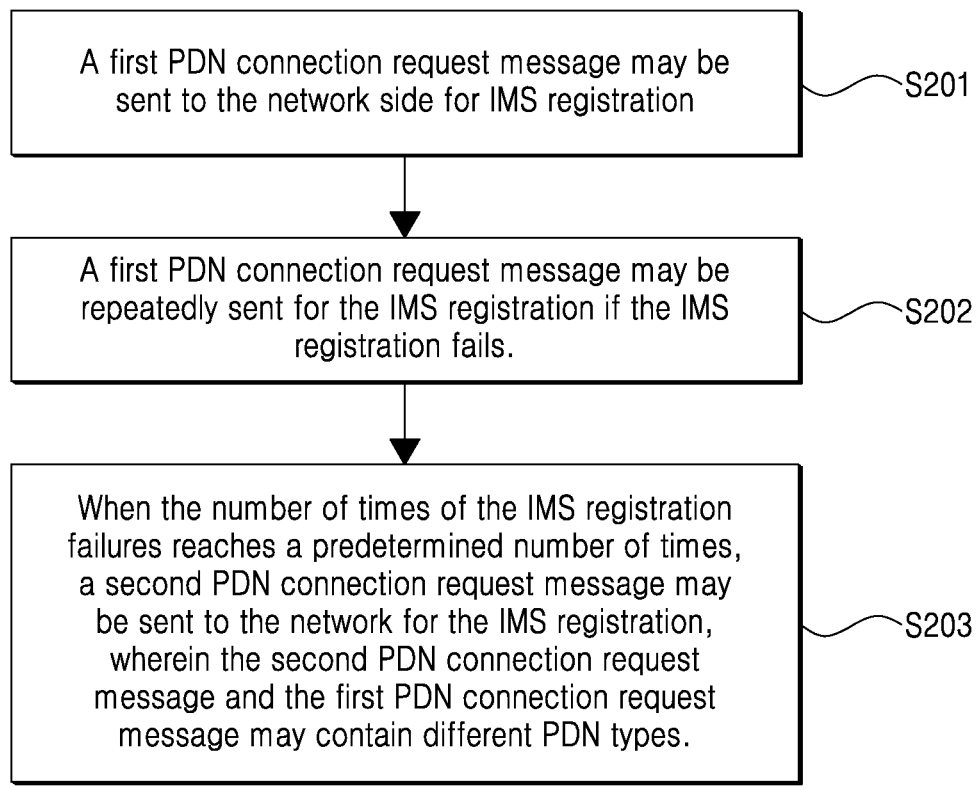
FIG. 2 is a flowchart showing a method for establishing a communication connection according to an embodiment of the present disclosure.
Figure 3:
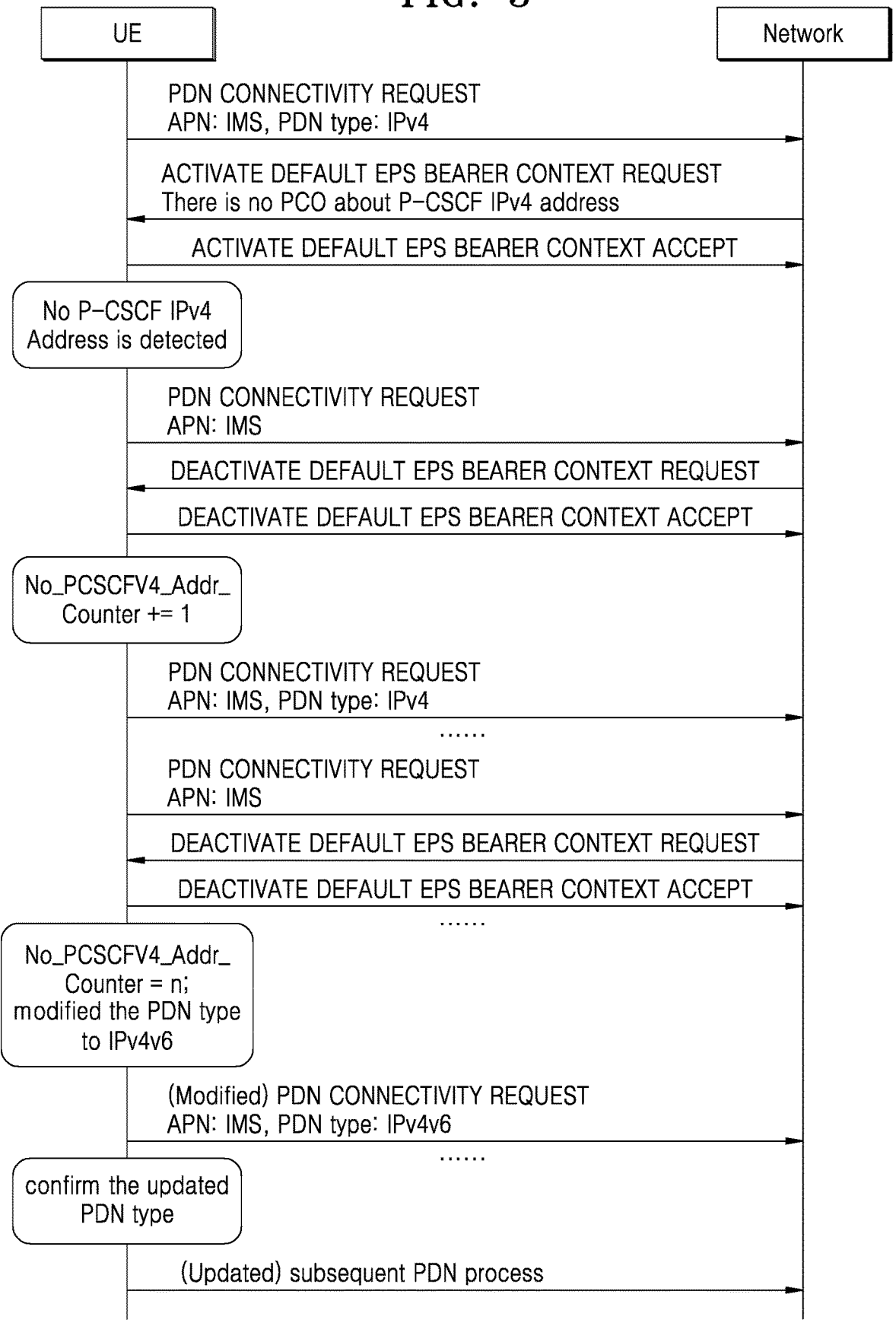
FIG. 3 is a diagram showing a UE registration IMS process according to an embodiment of the present disclosure.

FIG. 2 is a flowchart showing a method for establishing a communication connection according to an embodiment of the present disclosure. FIG. 3 is a diagram showing a UE registration IMS process according to an embodiment of the present disclosure. A method for establishing the communication connection shown in FIG. 2 will be described in detail below with reference to FIG. 3.

Referring to FIG. 2, in step S201, a first PDN connection request message may be sent to the network side for IMS registration. The first PDN connection request message may include a PDN type and access point (APN) type information indicating the IMS.

For example, referring to FIG. 3, when the UE side wants to establish an IMS PDN connection with the network side, the UE side sends a "PDN CONNECTIVITY REQUEST" message containing an APN type indicating the IMS and the PDN type (e.g., here, the PDN type is IPv4) to the network side. When the network side does not support the PDN type (for example, the IPv4 single stack shown in FIG. 3), an "ACTIVATE DEFAULT EPS BEARER CONTEXT REQUEST" message sent from the network side does not carry a protocol configuration option (PCO) about the P-CSCF IP address (for example, there is no PCO P-CSCF IPv4 address in the "ACTIVATE DEFAULT EPS BEARER CONTEXT REQUEST" message), for example, the IP address in the "ACTIVATE DEFAULT EPS BEARER CONTEXT REQUEST" message is empty. The UE side sends an "ACTIVATE DEFAULT EPS BEARER CONTEXT ACCEPT" message to the network side in response to receiving the "ACTIVATE DEFAULT EPS BEARER CONTEXT REQUEST" message. At this time, the protocol layer of the UE side agrees to activate the PDN connection process.

Referring back to FIG. 2, in step S202, the first PDN connection request message may be repeatedly sent for the IMS registration if the IMS registration fails.

According to an embodiment of the present disclosure, when a response message that does not carry an Internet Protocol (IP) address, for the first PDN connection request message is received from the network side, it may be determined that the IMS registration fails. Referring to FIG. 3, when the UE side cannot detect the corresponding IP address, a signaling addressing cannot be performed although the UE protocol layer may activate the IMS PDN connection process, and thus the UE side immediately sends a "PDN DISCONNECT REQUEST" message to the network side to disconnect the PDN connection and receives a "DEACTIVATE DEFAULT EPS BEARER CONTEXT REQUEST" message based on the "PDN DISCONNECT REQUEST" message, from the network side. In response to receiving the "DEACTIVATE DEFAULT EPS BEARER CONTEXT REQUEST" message, the UE sends a "DEACTIVATE DEFAULT EPS BEARER CONTEXT ACCEPT" message to the network side, thereby determining an IMS registration failure has occurred between the UE side and the network side. Then, the UE side repeatedly sends a "PDN CONNECTIVITY REQUEST" message containing the APN type indicating the IMS and the PDN type (here, for example, the PDN type is IPv4) and determines whether the IMS registration is successful at a specific time interval. A number of times the IMS registration fails is counted by a counter. For example, when the IMS registration fails once due to the IP address being empty between the UE and the network side, the count value (for example, No_PCSCFV4_Addr_Counter) of the counter is increased by one.

According to an embodiment of the present disclosure, there may be a specific time period between processes of repeatedly sending the first PDN connection request message for two consecutive times.

Referring back to FIG. 2, in step S203, when the number of times the IMS registration fails reaches a predetermined number, a second PDN connection request message may be sent to the network for the IMS registration. Here, the second PDN connection request message and the first PDN connection request message may contain different PDN types. According to an embodiment of the present disclosure, the second PDN connection request message may also include access point (APN) type information indicating the IMS.

Referring to FIG. 3, a counter is used to count the number of times the IMS registration fails until the number of times the IMS registration fails reaches a predetermined number n (for example, No_PCSCFV4_Addr_Counter=n). When the number of times the IMS registration fails reaches the predetermined number n, the UE side modifies the PDN type (e.g., here, the PDN type is modified from IPv4 to IPv4v6), and resends a "PDN CONNECTIVITY REQUEST" message containing the APN type indicating the IMS and the modified PDN type, and then the UE side continues the process of establishing the PDN connection based on the updated PDN type, and continues the subsequent updated PDN process after confirming the updated PDN type.

According to an embodiment of the present disclosure, the PDN type contained in the first PDN connection request message may be an Internet protocol version 4 (IPv4) single stack, and the PDN type contained in the second PDN connection request message may be an IPv4v6 dual stack.

A method for establishing a communication connection according to an embodiment of the present disclosure may also include initializing the counter for counting the number of times the IMS registration fails when sending the second PDN connection request message to the network side for the IMS registration. Referring to FIG. 3, after sending the modified PDN connection request message, the counter may be initialized to clear the count value of the counter for a next PDN connection process of automatically modifying the PDN type.

Figure 4:
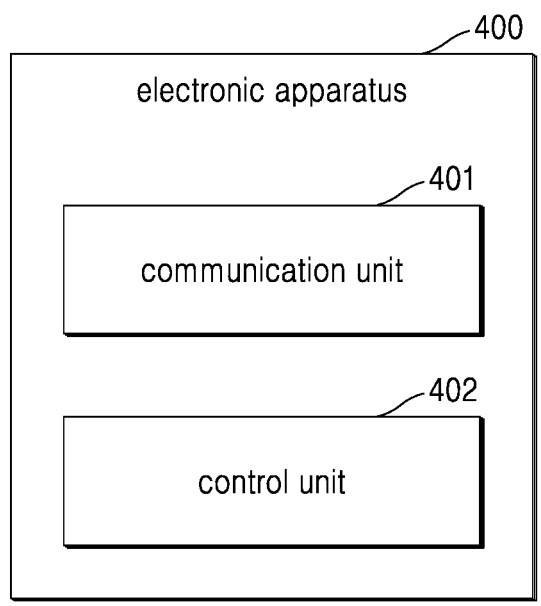
FIG. 4 is a diagram showing an electronic apparatus capable of establishing a communication connection according to an embodiment of the present disclosure.

FIG. 4 is a diagram showing an electronic apparatus 400 capable of establishing a communication connection according to an embodiment of the present disclosure.

Referring to FIG. 4, the electronic apparatus 400 capable of establishing a communication connection according to an embodiment of the present disclosure may include a communication unit 401 and a control unit 402.

For example, the communication unit 401 may be configured to communicate with the network side. The control unit 402 may be configured to control the communication unit 401 to send a first packet data network (PDN) connection request message to the network side for internet protocol multimedia subsystem (IMS) registration, control the communication unit 401 to repeatedly send the first PDN connection request message for the IMS registration when it is determined that the IMS registration fails, and control the communication unit 401 to send a second PDN connection request message to the network side for the IMS registration when it is determined that a number of times of IMS registration failures reaches a predetermined number of times. The second PDN connection request message and the first PDN connection request message may contain different PDN types.

According to an embodiment of the present disclosure, the control unit 402 may determine that the IMS registration fails when the communication unit 401 receives a response message without carrying an Internet Protocol (IP) address, for the first PDN connection request message, from the network side.

According to an embodiment of the present disclosure, the PDN type contained in the first PDN connection request message may be an Internet protocol version 4 (IPv4) single stack, and the PDN type contained in the second PDN connection request message may be an IPv4v6 dual stack.

According to an embodiment of the present disclosure, the control unit 402 may initialize a counter for counting the number of times the IMS registration fails, when the communication unit 401 sends the second PDN connection request message to the network side for the IMS registration.

According to an embodiment of the present disclosure, the first PDN connection request message and the second PDN connection request message may further comprise access point (APN) type information indicating the IMS.

According to an embodiment of the present disclosure, there may be a specific time period between processes of repeatedly sending the first PDN connection request message for two consecutive times.

Although exemplary embodiments of the present disclosure have been shown and described with reference to the figures, the present disclosure is not necessarily limited to the specific embodiments or the accompanying drawings, and those skilled in the art will understand that various changes in form and details may be made, without departing from the spirit and scope of the present disclosure.

What is claimed is:

1. A method for establishing a communication connection, comprising:
    sending a first packet data network (PDN) connection request message to a network side for Internet Protocol multimedia subsystem (IMS) registration;
    repeatedly sending the first PDN connection request message for the IMS registration when the IMS registration fails; and
    sending a second PDN connection request message to the network side for the IMS registration when a number of times the IMS registration fails reaches a predetermined number,
    wherein the second PDN connection request message and the first PDN connection request message contain different PDN types.

2. The method of claim 1, wherein it is determined that the IMS registration fails when a response message not carrying an Internet Protocol (IP) address for the first PDN connection request message is received from the network side.

3. The method of claim 1, wherein the PDN type contained in the first PDN connection request message is an Internet protocol version 4 (IPv4) single stack, and the PDN type contained in the second PDN connection request message is an IPv4v6 dual stack.

4. The method of claim 1, further comprising: initializing a counter for counting a number of times the IMS registration fails when sending the second PDN connection request message to the network side for the IMS registration.

5. The method of claim 1, wherein the first PDN connection request message and the second PDN connection request message each further comprise access point (APN) type information indicating the IMS registration.

6. The method of claim 1, wherein a period of time between processes of repeatedly sending the first PDN connection request message is the same for two consecutive times.

7. An electronic apparatus capable of establishing a communication connection, comprising:
  a transceiver configured to communicate with a network side;
  a processor configured to:
    control the transceiver to send a first packet data network (PDN) connection request message to the network side for internet protocol multimedia subsystem (IMS) registration;
    control the transceiver to repeatedly send the first PDN connection request message for the IMS registration when it is determined that the IMS registration fails; and
    control the transceiver to send a second PDN connection request message to the network side for the IMS registration when it is determined that a number of times the IMS registration failures reaches a predetermined number,
  wherein the second PDN connection request message and the first PDN connection request message contain different PDN types.

8. An electronic apparatus of claim 7, wherein the processor determines that the IMS registration fails when the transceiver receives a response message without carrying an Internet Protocol (IP) address, for the first PDN connection request message, from the network side.

9. The electronic apparatus of claim 7, wherein the PDN type contained in the first PDN connection request message is an Internet protocol version 4 (IPv4) single stack, and the PDN type contained in the second PDN connection request message is an IPv4v6 dual stack.

10. The electronic apparatus of claim 7, wherein the processor initializes a counter for counting the number of times the IMS registration fails when the transceiver sends the second PDN connection request message to the network side for the IMS registration.

11. The electronic apparatus of claim 7, wherein the first PDN connection request message and the second PDN connection request message each further comprise access point (APN) type information indicating the IMS registration.

12. The electronic apparatus of claim 7, wherein there is a specific time period between processes of repeatedly sending the first PDN connection request message for two consecutive times.

13. A computer system comprising:
  a processor; and
  a non-transitory, tangible, program storage medium, readable by the computer system, embodying a program of instructions executable by the processor to perform method steps for establishing a communication connection, the method comprising:
    sending a first packet data network (PDN) connection request message to a network side for Internet Protocol multimedia subsystem (IMS) registration;
    repeatedly sending the first PDN connection request message for the IMS registration when the IMS registration fails; and
    sending a second PDN connection request message to the network side for the IMS registration when a number of times the IMS registration fails reaches a predetermined number,
    wherein the second PDN connection request message and the first PDN connection request message contain different PDN types.

14. The computer system of claim 13, wherein it is determined that the IMS registration fails when a response message not carrying an Internet Protocol (IP) address for the first PDN connection request message is received from the network side.

15. The computer system of claim 13, wherein the PDN type contained in the first PDN connection request message is an Internet protocol version 4 (IPv4) single stack, and the PDN type contained in the second PDN connection request message is an IPv4v6 dual stack.

16. The computer system of claim 13, the method further comprising: initializing a counter for counting a number of times the IMS registration fails when sending the second PDN connection request message to the network side for the IMS registration.

17. The computer system of claim 13, wherein the first PDN connection request message and the second PDN connection request message each further comprise access point (APN) type information indicating the IMS registration.

18. The computer system of claim 13, wherein a period of time between processes of repeatedly sending the first PDN connection request message is the same for two consecutive times.

* * * * *